United States Patent
McGreal et al.

[19]

[11] Patent Number: 6,165,089
[45] Date of Patent: Dec. 26, 2000

[54] TRANSMISSION APPARATUS AND METHOD

[76] Inventors: Timothy R. McGreal, 329 Shenstone Rd., Riverside, Ill. 60546; Thomas A. Olson, 455 Sauk La., Bolingbrook, Ill. 60440; Guntis Ozers, 6425 Bobby Jones La., Woodridge, Ill. 60517; Ryan Schultz, 172 S. Highpoint Dr./#208, Romeoville, Ill. 60446

[21] Appl. No.: 09/152,714

[22] Filed: Sep. 14, 1998

Related U.S. Application Data

[63] Continuation-in-part of application No. 09/061,086, Apr. 15, 1998.

[51] Int. Cl.[7] .................................. F16H 7/08; F16H 7/12
[52] U.S. Cl. .......................... 474/101; 474/133; 474/135; 474/88; 474/138
[58] Field of Search .................................. 474/88, 87, 89, 474/76–77, 101, 110, 112, 117, 133–138, 141, 132, 75; 198/793

[56] References Cited

U.S. PATENT DOCUMENTS

| | | |
|---|---|---|
| 1,240,040 | 9/1917 | Fowler . |
| 2,341,273 | 2/1944 | Helberg ................................ 474/138 X |
| 2,676,377 | 4/1954 | Garcia . |
| 2,702,485 | 2/1955 | Nadherny ................................ 474/138 |
| 3,161,906 | 12/1964 | Yarm . |
| 3,963,607 | 6/1976 | Bedwell et al. ..................... 198/793 X |
| 4,251,014 | 2/1981 | Salley et al. . |
| 4,471,512 | 9/1984 | Thalenfeld . |
| 4,637,808 | 1/1987 | Nakamura ................................ 474/80 |
| 4,758,205 | 7/1988 | Durham ................................ 474/80 |
| 5,013,285 | 5/1991 | Carlyle ................................ 474/80 |
| 5,414,911 | 5/1995 | Adams . |
| 5,848,947 | 12/1998 | Fornasiere et al. ................. 474/959 X |

FOREIGN PATENT DOCUMENTS

| | | |
|---|---|---|
| 2393987 | 2/1979 | France . |
| 345298 | 12/1993 | Japan . |

OTHER PUBLICATIONS

Brochure from Stanhay Singulaire 785 entitled "The Precision Vacuum Seeder From Stanhay" (Stanhay Webb Limited, undated, 4 pp.).

Brochure entitled "Accord Precison Seed Drill Optima Operating Instructions," (Accord Landmaschinen H. Weiste & Co. GmbH, undated, 55 pp.).

Brochure entitled "Monosem Pneumatic Planter Operator's Manual, Operator's Manual NG Plus Mounted Planter, Includes; Instructions For: Operations, Adjustment, Maintenance" (A.T.I., Inc., Monosem, undated, 57 pp.).

Brochure entitled "Monosem The Precision Vacuum Planter, NG Plus Series, The New Generation Of Planters," (Monosem, A.T.I., Inc., undated, 12 pp.).

Brochure entitled "Kinze 2000 Series Planters; 2000 Pull Type; 2100 Three Point Mounted; 2200 Flex Econo–Fold®; 2300 Twin–Line®," (Kinze Manufacturing, Inc., Aug. 1993, 24 pp.).

Brochure entitled "Kinze 2000 Series Planters; 2000 Pull Type; 2100 Three Point Mounted; 2200 Flex Econo–Fold®; 2500 Twin–Line®; 2600 Twin–Line®; 2700 Front Folding," (Kinze Manufacturing, Inc., Aug. 1996, 40 pp.).

(List continued on next page.)

*Primary Examiner*—David A. Bucci
*Assistant Examiner*—Marcus Charles
*Attorney, Agent, or Firm*—Brinks Hofer Gilson & Lione

[57] ABSTRACT

A transmission apparatus includes a chain operatively engaged with a driver sprocket assembly and a driven sprocket assembly, a tensioner bracket including a roller engaged with the chain, a tensioner rod including a plurality of spaced apart flange portions engageable with a brace and a threaded portion extending through an opening formed in the tensioner bracket and screwably attached to a plate. An operator may unscrew the tensioner rod and pass at least one of the flange portions through a slot in the brace to slacken the chain. The operator may also position at least one flange portion in a narrow end of the slot, and screw the tensioner rod to press that flange against the brace to tighten the chain.

27 Claims, 8 Drawing Sheets

OTHER PUBLICATIONS

Brochure entitled: Advantage 1780, New Planter . . . New Sales Advantages, "New John Deere 1780 Narrow–Row Planter," Kinze 2600 Twin–Line Planter (John Deere, 1995, 8 pp.).

Brochure entitled "Planter Attachments, MaxEmerge Plus VacuMeter," (John Deere Credit, 1997, 24 pp.).

Brochure entitled "WC Inc., WIC Precision Vacuum Planter, Operators' Manual and Parts Book 1994" (WIC Inc., 1994, 57 pp.).

TRANSMISSION APPARATUS AND METHOD

RELATED APPLICATIONS

This application is a continuation-in-part application of U.S. application Ser. No. 09/061,086, filed Apr. 15, 1998, the entire disclosure of which is incorporated herein by reference.

FIELD OF THE INVENTION

The present invention relates to a transmission for a seed planter for dispensing individual seeds at a controlled rate into a seed furrow, and more particularly to a seed planter transmission which can be easily adjusted to change between dispensing speeds.

BACKGROUND OF THE INVENTION

Seed meters of various designs are used to dispense seeds at a controlled rate into a seed furrow as the seed meter is advanced above and along the seed furrow. In a typical arrangement, a tractor is coupled to tow a tool bar to which are attached in a generally parallel, spaced apart relation, a plurality of planting units each having a seed meter arrangement. Each planting unit typically includes a seed hopper which holds and carries a large quantity of seeds which are to be planted. Alternatively, a smaller container is fed with seeds from a centralized bin or large hopper. The planting unit includes a device for opening a furrow in the ground as the tractor draw tool bar is advanced across the field over the ground. A feed meter is coupled to the seed hopper to dispense individual seeds into the furrow at a controlled rate. The planting unit also typically includes a device for moving soil at the sides of the furrow to close the furrow over the seeds.

During planting, the tractor typically moves across the field at speeds of about 4 to 8 miles per hour. The spacing between adjacent individual seeds in each furrow can be as small as 0.5 inches or less or as much as 10 inches or even more depending upon the particular seed being planted.

The seed metering mechanism therefore, must be capable of dispensing seeds at various rates in the order of 5 to 150 seeds per second. The seed meter mechanism may also be required to dispense seeds at greater rates as well as rates which are less depending on the use.

The types of seeds to be planted using a seed metering mechanism may include, for example, corn, cotton, sorghum, sugar beets, soybeans and sunflowers. As will be appreciated, such seeds vary considerably in size, weight and shape. For example, peanut and edible bean seeds are among the largest seeds for planting and have elongated, irregular shapes and outer surfaces. Soybean and pelletized seeds are smaller and tend to be rounder and vary in shape and size. Sorghum and raw sugar beet seeds have a rounder, almost spherical appearance. Sorghum seeds have a relatively smooth outer surface. On the other hand, raw sugar beet seeds have a very rough and irregular outer surface configuration. Cotton seed is small and shaped like some corn seed. On the other hand, corn seeds have a somewhat triangular shape with generally flat sides.

Despite these numerous differences in size, shape and surface of such seeds, seed meters must handle all different types of seeds described above as well as many more while requiring minimum effort regarding part changes and adjustments. At the same time, required spacing and depth standards of planting accuracy typically mandate a low error rate. A missed seed or doubling of seeds is undesirable and may be tolerated only very infrequently. Such requirements place considerable demand upon the accuracy of the seed metering mechanism.

A significant problem, which must be addressed by such feed metering units, is the ability to easily change from one metering or dispensing speed to another. The speed or rate at which seeds are dispensed has been controlled in existing planters by a sprocket and chain-type transmission. Such transmissions are permanently mounted between individual planting units. The transmission is usually placed in the middle of the planter, between planting units. In such devices, a ground wheel assembly, mounted on a frame, drives the transmission. The transmission in turn rotates a shaft which is connected to the individual planting unit seed meters. This arrangement eliminates the need for a separate drive wheel for each individual unit. Additionally, the rate at which seeds are planted can be adjusted for all of the units by adjusting the single transmission.

In these sprocket and chain-type transmissions, sprockets or sprocket clusters are fixably connected to rotate with a shaft. A chain is entrained between a sprocket on one shaft and a sprocket on another shaft. The rate of seed dispensing is changed by changing the size of one or both of the sprockets around which the chain is entrained.

In one existing system, the sprocket size is changed by physically removing the existing sprocket from the shaft and replacing it with the desired size. This requires a significant amount of effort and time to change the sprocket. Additionally, tools are required to make the change. This system has the obvious disadvantages of requiring a significant amount of effort and time and the need for tools every time the sprocket size is changed.

Another existing system uses sprockets, which are connected to each other in a cluster. The sprocket cluster slides along the length of a shaft but is fixed to rotate with the shaft. A plurality of rubber spacers are arranged on the shaft, on both sides of the sprocket cluster, to hold the sprocket cluster in the desired position. The spacers are split along the axial direction to permit the spacers to be clipped on and off of the shaft. When it is desired to change the size of the sprocket, one or more of the spacers are removed from one side of the sprocket cluster allowing the sprocket cluster to slide along the shaft until the desired sprocket is aligned with the chain. The removed spacers are then mounted on the other side of the sprocket cluster such that the sprocket cluster is held in the desired axial position on the shaft. One problem with this arrangement is that the rubber spaces may fall off of the shaft due to the vibration or movement of the planter in the field. This may be due to the circular inner wall of the spacer, which is engaged with the typically hexagonal shafts. This circular wall has a tendency to help widen the split and force the spacers off the hex shaft. These spacers are also difficult to press on to the hex shaft. Adjustment of this arrangement is therefore cumbersome and time-consuming.

Another concern with existing planter transmissions is their width. Since the transmission is placed between planting units, it is desirable to have a relatively narrow transmission so that the space between adjacent planting units is also narrow.

Therefore, it is an object of the present invention to provide a transmission for a planter with variable feeding rates wherein the adjustment between feeding rates can be adjusted with minimal effort and without the need for special tools.

SUMMARY OF THE INVENTION

One aspect of the invention provides a transmission apparatus comprising a chain operatively engaged with a driver sprocket assembly and a driven sprocket assembly, a tensioner bracket including a roller rotatably attached to the tensioner bracket, the roller engaged with the chain, the tensioner rod including a plurality of spaced apart flange portions and a threaded portion, the threaded portion extending through an opening formed in the tensioner bracket and screwably attached to a plate, and the flange portions engageable with a brace. The transmission apparatus further preferably includes a spring positioned between the plate and the tensioner bracket. A stop may also be positioned between the spring and the plate. The spaced apart flange portions may comprise a plurality of alternating large diameter spacers and small diameter spacers attached to the tensioner rod. The brace may include a slot formed therein to receive a portion of the tensioner rod. The slot may preferably include a wide end, which allows the flange portion to pass through, and a narrow end, which prevents the flange portion from passing through. The driver sprocket assembly may comprise an input driver sprocket assembly and the driven sprocket assembly may comprise an input driven sprocket assembly. The input driver sprocket assembly may include one sprocket and the input driven sprocket assembly may include 4 different sized sprockets. The transmission apparatus may further include a hex shaft with the input driven sprocket assembly slidably attached to the hex shaft. An output driver sprocket assembly may also be attached to the hex shaft, the output driver sprocket assembly may include 5 different sized sprockets. An output driven sprocket assembly attached to an output hex shaft may include 6 different sized sprockets. A second chain is engaged with the output driver sprocket assembly and the output driven sprocket assembly. A tension roller is rotatably attached to a second tensioner assembly. This allows an operator to position the transmission at 120 different ratio combinations. The transmission apparatus may further include at least one idler roller, and preferably a pair of idler rollers positioned on either side of the tensioner roller and engaged with the chain. The transmission apparatus may further include a hex shaft with the driven sprocket assembly slidably attached to the hex shaft and a plurality of positioning members removably attached to the hex shaft and positionable on either side of the driven sprocket assembly. Each of the positioning members may preferably include a body portion including a hexagonal-shaped inner wall for receiving the hex shaft and a pair of extended gripping portions extending from the body to allow a gap formed through the body portion to be widened to allow the positioning member to be inserted on the hex shaft. The positioning members may be made of Neoprene. The positioning members may further include a tapered portion on the body portion to allow the positioning members to be easily inserted on to the hex shaft. The chain includes a top portion and a bottom portion, wherein a tension side of the chain may be either on the top portion or the bottom portion and wherein a slack side of the chain may be either on the top portion or the bottom portion.

A further aspect of the invention provides a method of operating a transmission apparatus. A chain operatively engaged with a driver sprocket assembly and a driven sprocket assembly is provided. A tensioner bracket including a roller rotatably attached to the tensioner bracket and engaged with the chain is also provided. A tensioner rod including a plurality of spaced apart flange portions and a threaded portion with the threaded portion extending through an opening formed in the tensioner bracket and screwably attached to the plate is also provided. The flange portions are engageable with a brace. The tensioner rod is turned in a first direction. At least one of the flange portions may then be passed through a slot formed in the brace. The chain is then slackened. The method further comprises providing a hex shaft with the driven sprocket assembly slidably attached to the hex shaft. The driven sprocket assembly includes a plurality of different size sprockets. A plurality of positioning members are removably attached to the hex shaft. The positioning members may include a body portion and a pair of extended gripping portions. The body portion includes a gap in a hexagonal-shaped inner wall. The extended gripping portions may be squeezed together to widen the gap. At least one of the positioning members may be removed from the hexagonal shaft. The driven sprocket assembly may be slid along the hex shaft in a desired direction. A slackened chain may then be positioned on one of the sprockets of the driven sprocket assembly. The gripping portions of the removed positioning member may then be squeezed together to widen the gap. The positioning member may then be reinserted on to the hex shaft at a different location. Next the tensioner assembly may be moved to a narrower end of the slot. One of the flange portions may then be contacted against a top surface of the brace. The tensioner rod may then be turned in a second direction to tighten the chain. A spring positioned between the plate and the tensioner bracket may be compressed during the tightening.

A further aspect of the invention provides a transmission apparatus comprising an input driver sprocket assembly, an input chain engaged with the input driver sprocket assembly, an input driven sprocket assembly engaged with the input chain and slidably attached to a first shaft, an output driver sprocket assembly slidably attached to the first shaft, a output chain engaged with the output driver sprocket assembly, an output driven sprocket assembly engaged with the output chain and slidably attached to a second shaft, a first tensioner assembly and a second tensioner assembly each including a bracket and a threaded rod extending through an opening formed in the bracket, a tensioner roller rotatably attached to the bracket, the threaded rod screwably attached to a plate and including a plurality of spaced apart flange portions. The tensioner roller of the first tensioner assembly engaged with the input chain and the flange portions of the first tensioner assembly operatively engageable with a brace. The tensioner roller of the second tensioner assembly engaged with the output chain and the flange portions of the second tensioner assembly operatively engageable with the brace. The brace may include a first slot for receiving the flange portions of the first tensioner assembly and a second slot for receiving the flange portions of the second tensioner assembly. The brace may comprise a U-shaped bracket. A spring may be positioned between the plate and the bracket of each of the first and second tensioner assemblies. The transmission apparatus may further include a pair of idler rollers engaged with the input chain and a pair of idler rollers engaged with the output chain. The transmission apparatus may further include a plurality of positioning members removably positioned on the first shaft and the second shaft. The input shaft and the output shaft may each comprise a hex shaft. The positioning members including a hexagonal-shaped inner wall to conform to the hex shaft and prevent the positioning members from falling off the input and output shafts.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
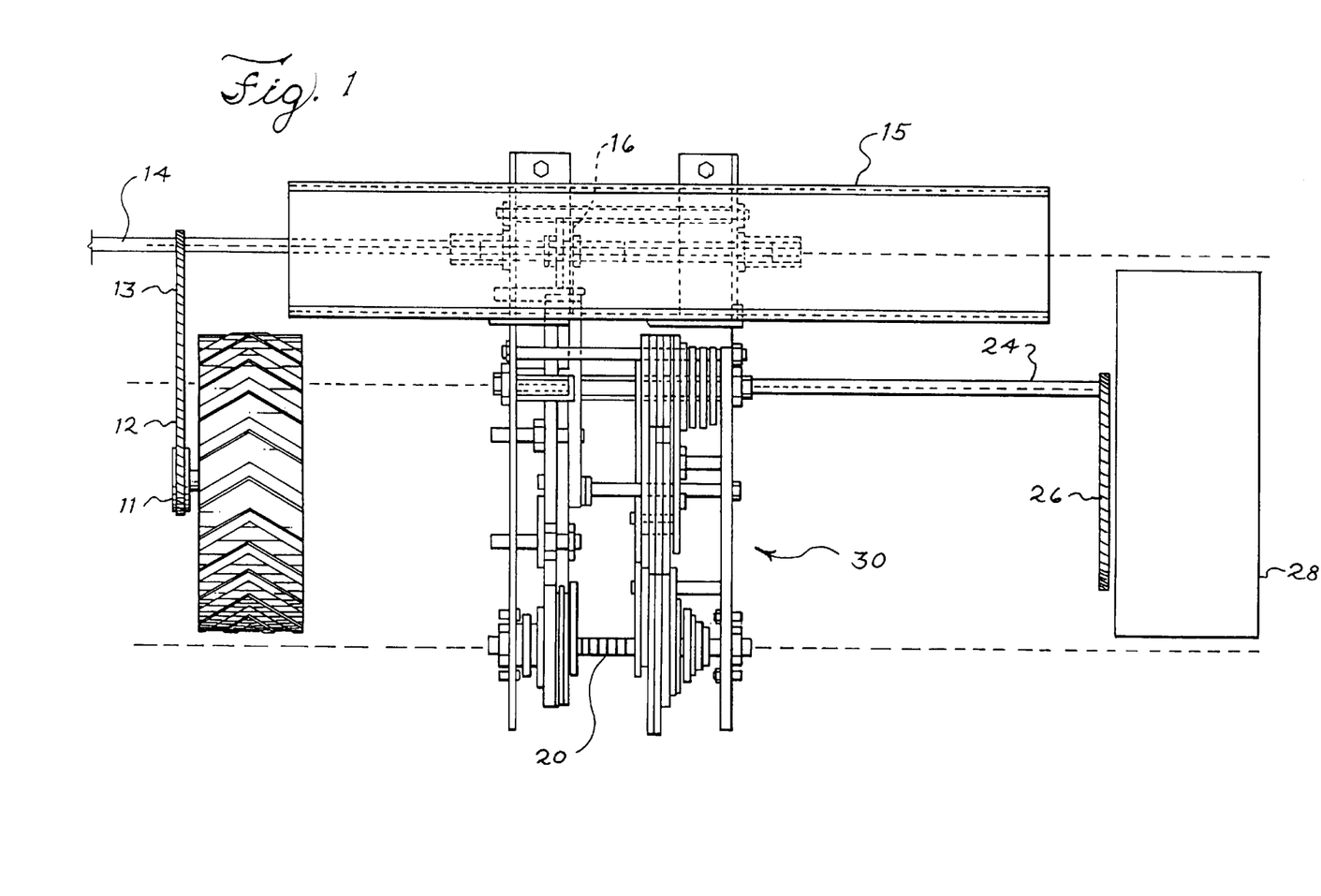
FIG. 1 is a schematic view of the drive train of a preferred embodiment of the transmission of the present invention.

Referring to FIG. 1, an embodiment of a drive train for use with the transmission of the present invention is illustrated. A drive wheel 10 rolls along the ground as the planter is pulled by a tractor tool tow bar 15. The drive wheel 10 is attached to a shaft 14, which rotates sprocket 11. A chain 12 is engaged with sprocket 11. The chain 12 is engaged with and rotates another sprocket 13, which is fixedly attached to rotate with an input shaft 14. Preferably, the drive wheel assembly includes a second drive wheel, sprocket, and chain assembly (not shown) to provide the driving force for the input shaft 14. The input shaft 14 is thus driven at a rate, which is determined by the speed of rotation of the drive wheel(s) 10. The input shaft 14 is used to drive each of the individual feed metering assemblies 26 on each of a plurality of planter units 28 via transmission 30 and.

Figure 7:
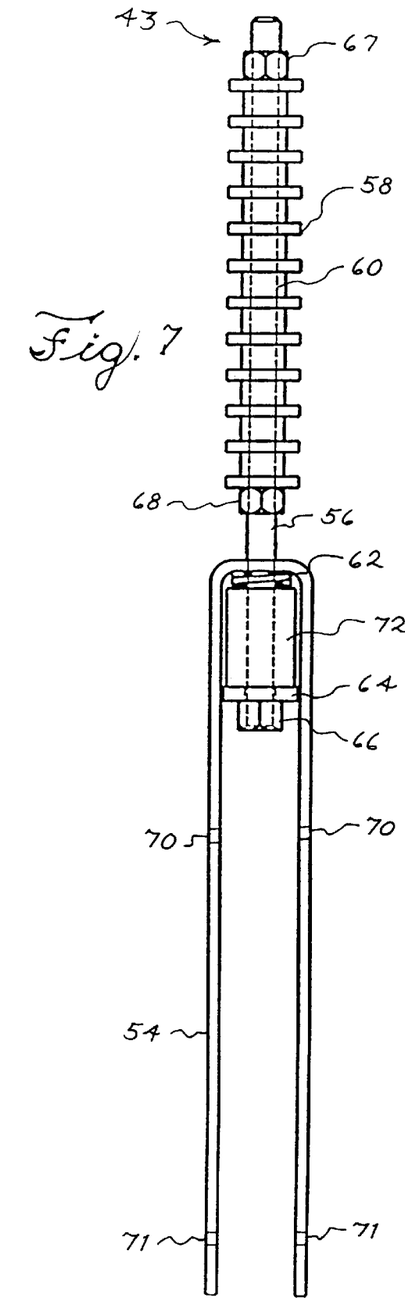
FIG. 7 is a side view of a preferred embodiment of a tensioner assembly in a loosened position.
Figure 8:
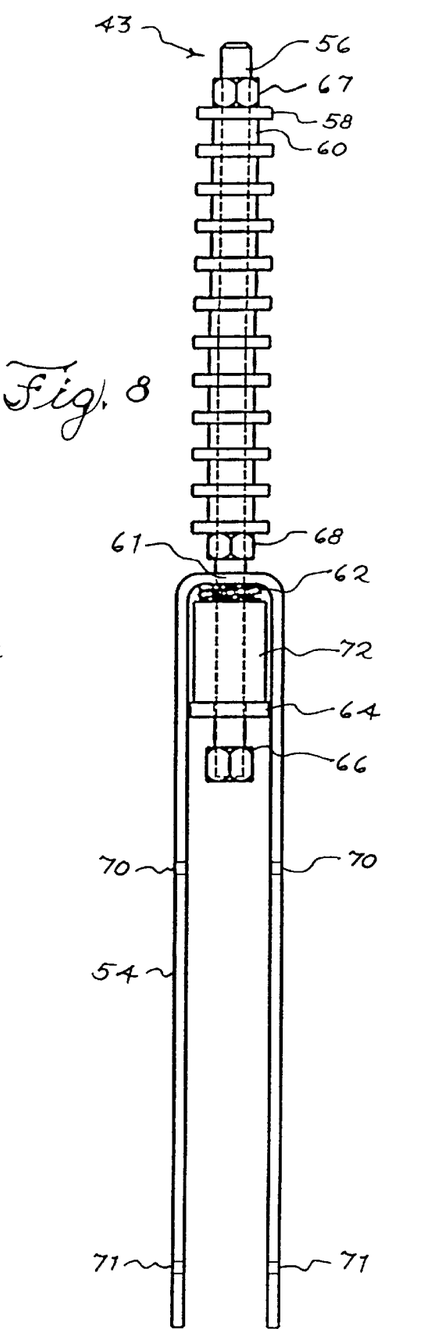
FIG. 8 is a side view of a preferred embodiment of FIG. 7 in a tightened position.

Referring to FIGS. 2–6, a preferred embodiment of a transmission apparatus 30 comprises an input driver sprocket assembly 32, input driven sprocket assembly 36, input tensioner assembly 38, output driver sprocket assembly 40, output driven sprocket assembly 42, output tensioner assembly 44, input chain 46, and output chain 48. Referring to FIGS. 7 and 8, a tensioner assembly 43 is shown, and is a preferred embodiment for the input tensioner assembly 38 and output tensioner assembly 44. The tensioner assembly 43 includes tensioner bracket 54, which includes openings 61 for receiving tensioner rod 56. Plate 64 includes a threaded opening to receive a threaded portion of tensioner rod 56. A retaining nut 66 is preferably attached at the end of the tensioner rod 56. A pair of nuts 67, 68 are positioned on each end of the plurality of alternating large diameter spacers 58 and small diameter spacers 60. Alternatively, the series of alternating spacers may be formed with the tensioner rod 56 as an integral member. For example, the large diameter spacers 58 may alternatively be spaced apart flanges extending axially outward from a upper portion of the tensioner rod 56. The bracket 54 preferably includes two sets of openings, including upper openings 70, which receive rod 57, and lower opening 71, which receive rod 53. The spacers 58, 60, tensioner rod 56 and plate 64 are preferably made, for example, of a zinc-coated steel or other rigid and durable material to prevent corrosion. Spring 62 is preferably positioned between the plate 64 and the underwall of brackets 54. The spring 62 picks up the slack as the chain lengthens with repeated use.

Figure 4:
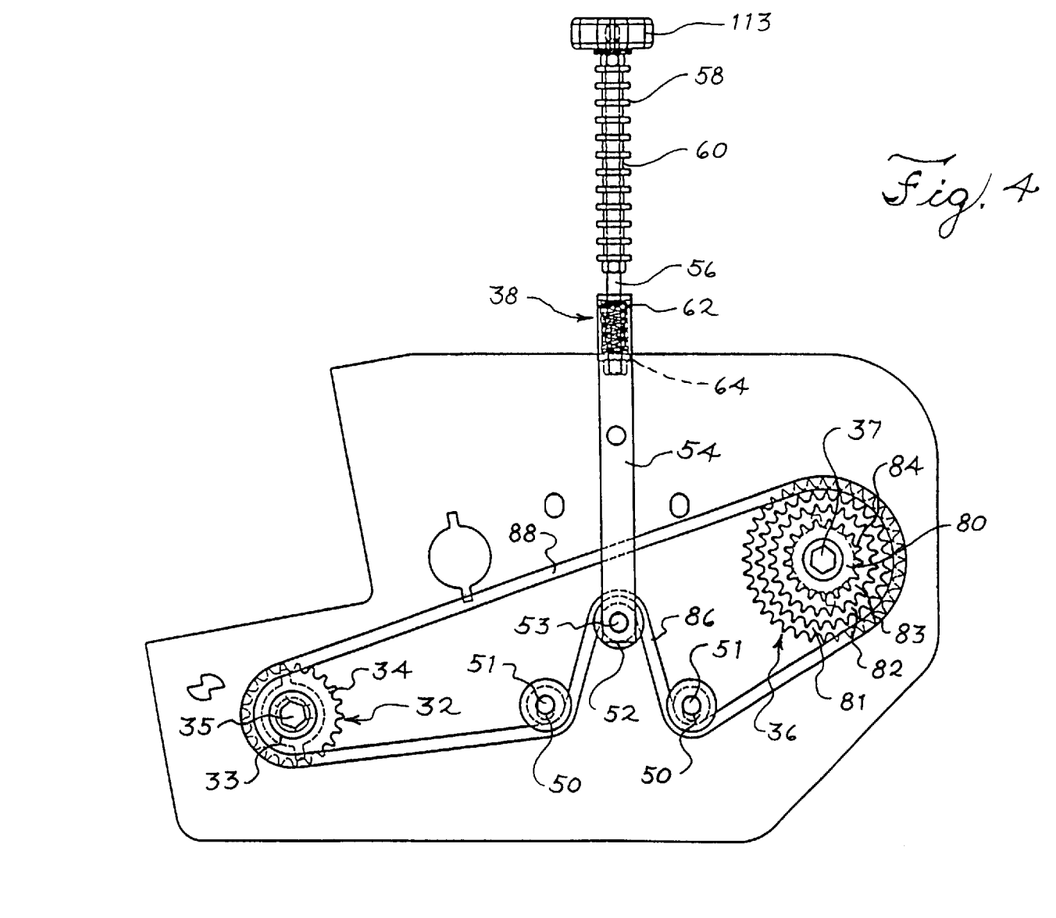
FIG. 4 is an input side view of the embodiment of FIG. 2.
Figure 6:
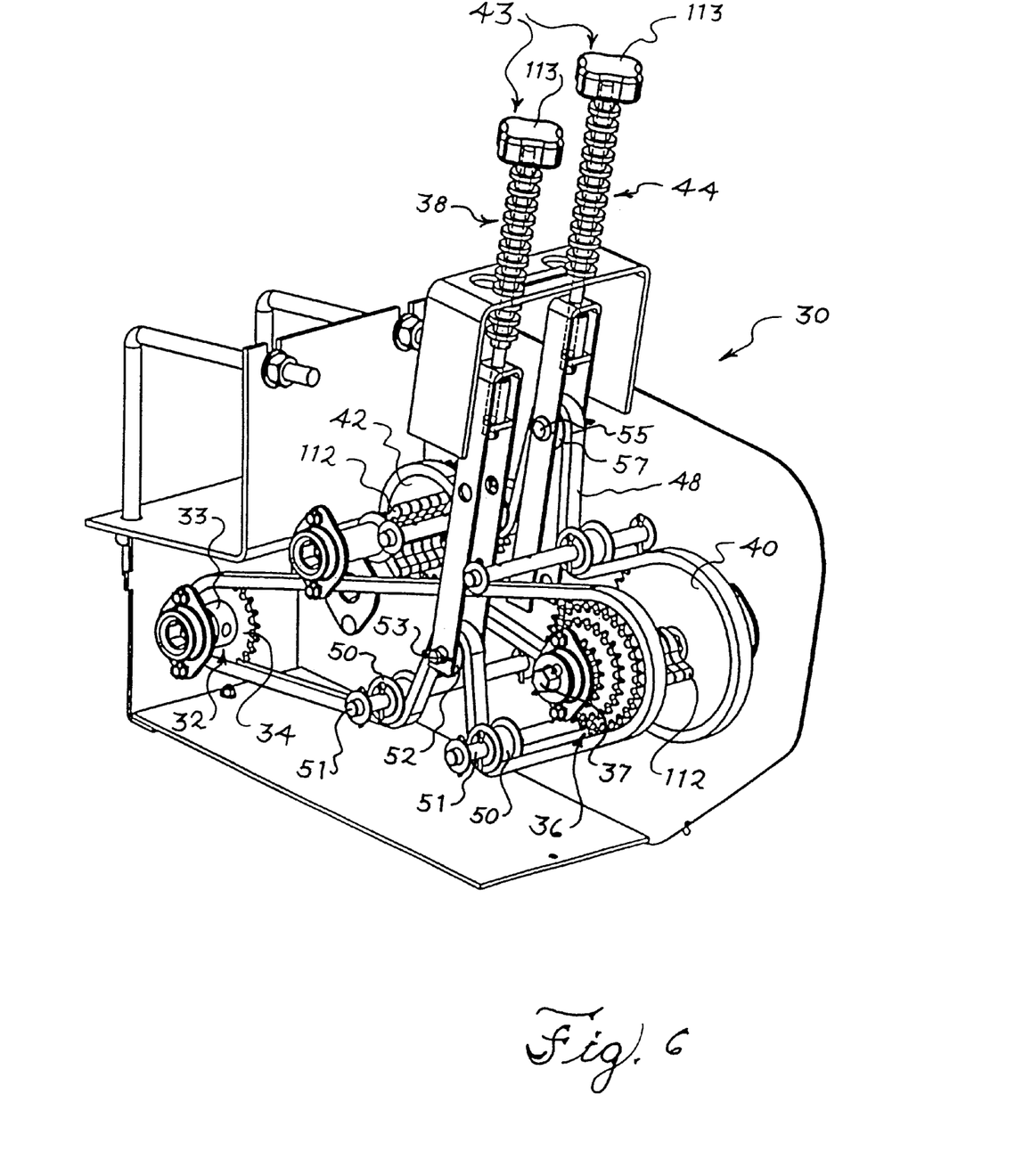
FIG. 6 is a left perspective view of the embodiment of FIG. 2.

As shown in FIGS. 4 and 6, the input side of the transmission apparatus 30 includes the input driver sprocket assembly 32, which includes a sprocket 34, attached to hub 33. The hub 33 mounts to hex shaft 35. In the embodiment shown, the sprocket 34 is preferably, for example, a 21 tooth, ½ inch pitch sprocket. The sprocket 34 is engaged with input chain 46. The chain 46 also engages with tensioner roller 52, which is rotatably attached to tensioner bracket 54 of input tensioner assembly 38 via rod 53. The rod 53 may be fixedly attached to the bracket 54 with, for example, conventional fasteners. The input chain 46 may also engage with idler rollers 50, which rotate on idler rods 51. The input chain 46 engages with input driven sprocket assembly 36. As shown in FIG. 4, the input driven sprocket assembly 36 includes a plurality sprockets 81–84 attached to hub 80. The hub 80 is slidably mounted on hex shaft 37. In a preferred embodiment, sprocket 81 has 36 teeth, sprocket 82 has 30 teeth, sprocket 83 has 24 teeth, and sprocket 84 has 17 teeth. Each of sprockets 81–84, for the embodiment shown, has a ½ inch pitch. Accordingly, the input side of the transmission is provided with 4 ratio combinations. The tension portion 88 of input chain 46 is on the top and the slack portion 86 of input chain 46 is on the bottom.

Figure 3:
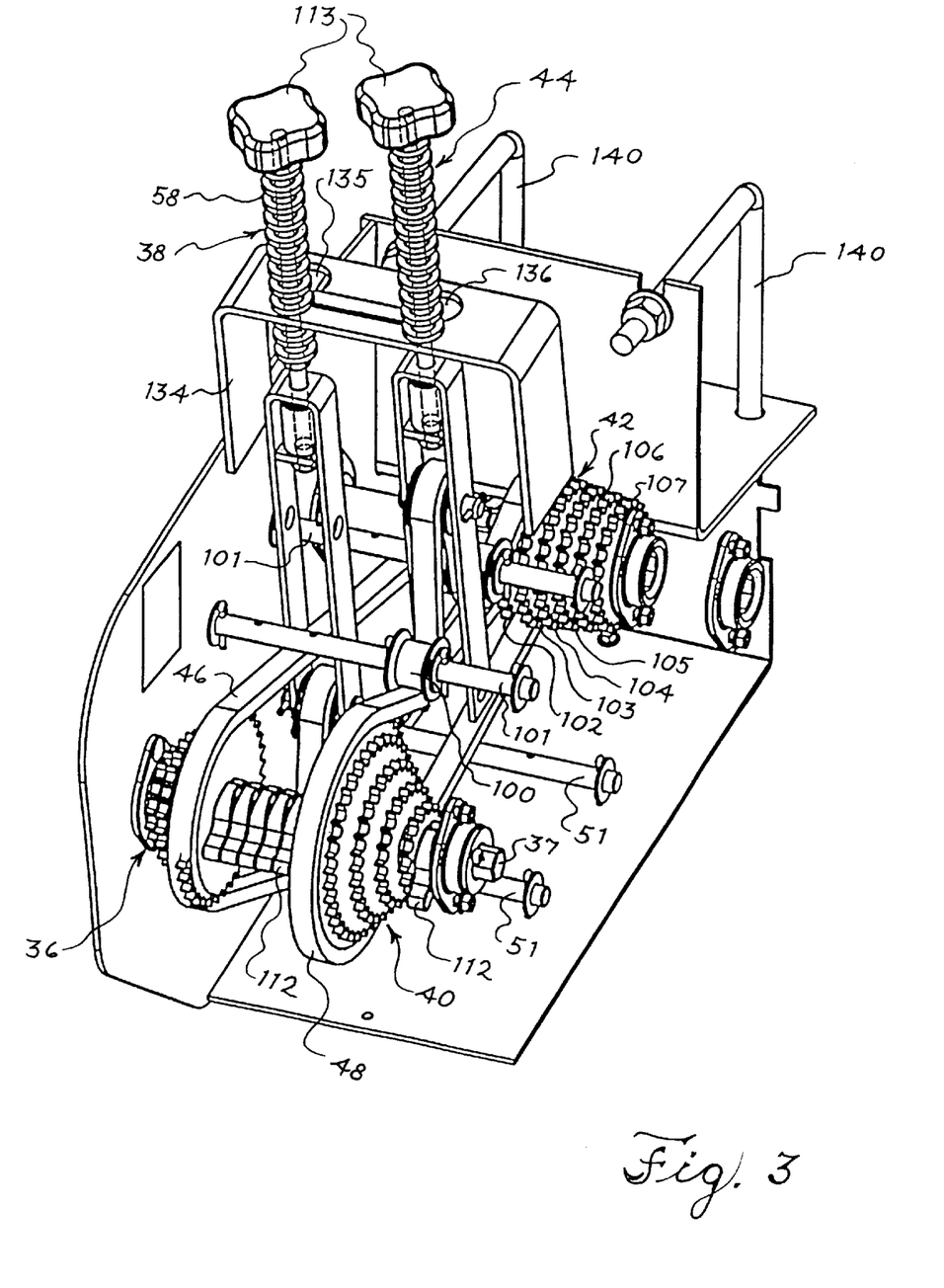
FIG. 3 is the right perspective view of the embodiment of FIG. 2 with the right side wall removed.
Figure 5:
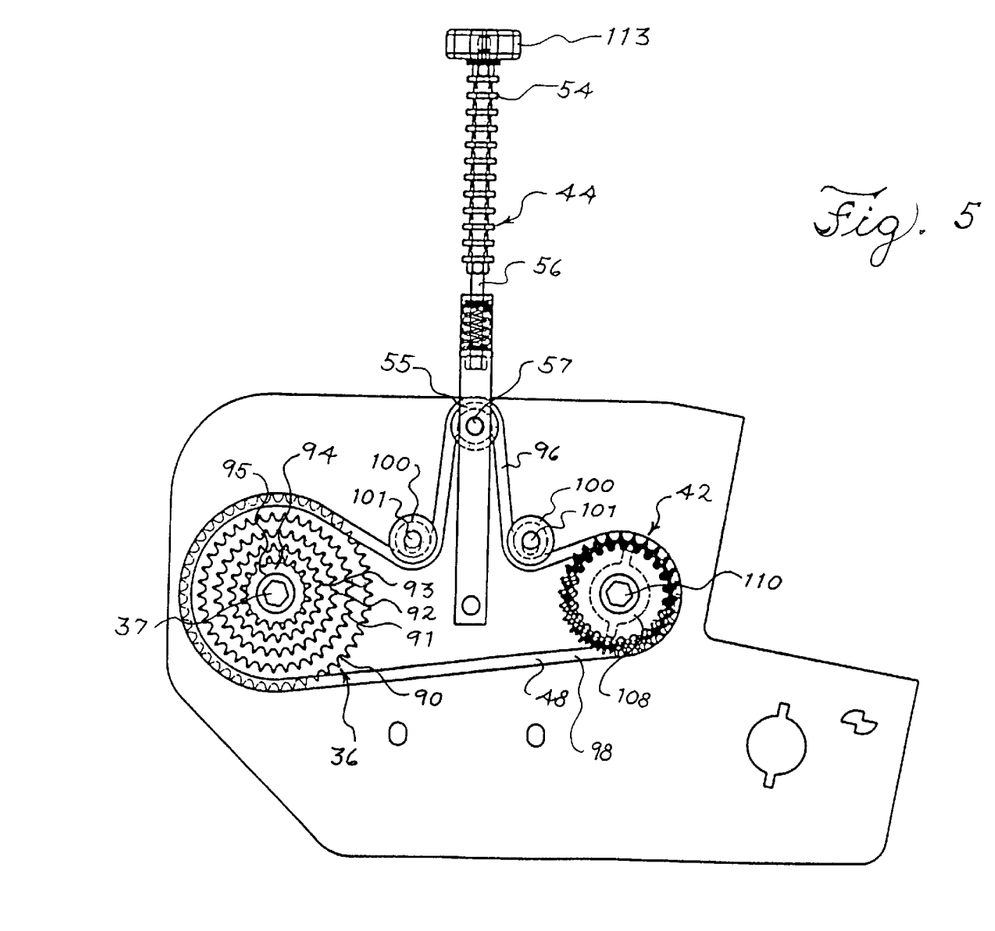
FIG. 5 is an output side view of the embodiment of FIG. 2.

Referring to FIGS. 3 and 5, the output side of the transmission 30 includes output driver sprocket assembly 40, which is engaged with output chain 48. In the embodiment of FIG. 5, the output driver sprocket assembly 40 includes a plurality of sprockets 90–91 attached to hub 95 which is slidably attached to hex shaft 37. In a preferred embodiment, sprocket 90 has 46 teeth, sprocket 91 has 37 teeth, sprocket 92 has 29 teeth, sprocket 93 has 22 teeth, and sprocket 94 has 16 teeth. Each of the sprockets 90–94, for the embodiment shown, has a ½ inch pitch. The output chain 48 engages with tensioner roller 55, which is rotatably attached to rod 57. The output chain 48 also preferably engages with idler rollers 100, which are rotatably attached to idler rods 101. The output chain 48 engages with output driven sprocket assembly 42. Output driven sprocket assembly 42 preferably includes a plurality of sprockets 102–107 attached to hub 108, which is slidably attached to output hex shaft 110. In a preferred embodiment, sprocket 102 has 28 teeth, sprocket 103 has 27 teeth, sprocket 104 has 26 teeth, sprocket 105 has 25 teeth, sprocket 106 has 24 teeth, and sprocket 107 has 23 teeth. Each of the sprockets 102–107, for the embodiment shown, has a ½ inch pitch. The output hex shaft 110 is coupled to output shaft 24 (shown in FIG. 1). As shown in FIG. 5, the slack portion 96 of output chain 48 is on the top and the tension portion 98 of output chain 48 is on the bottom.

Figures 9, 10, 11, 12:
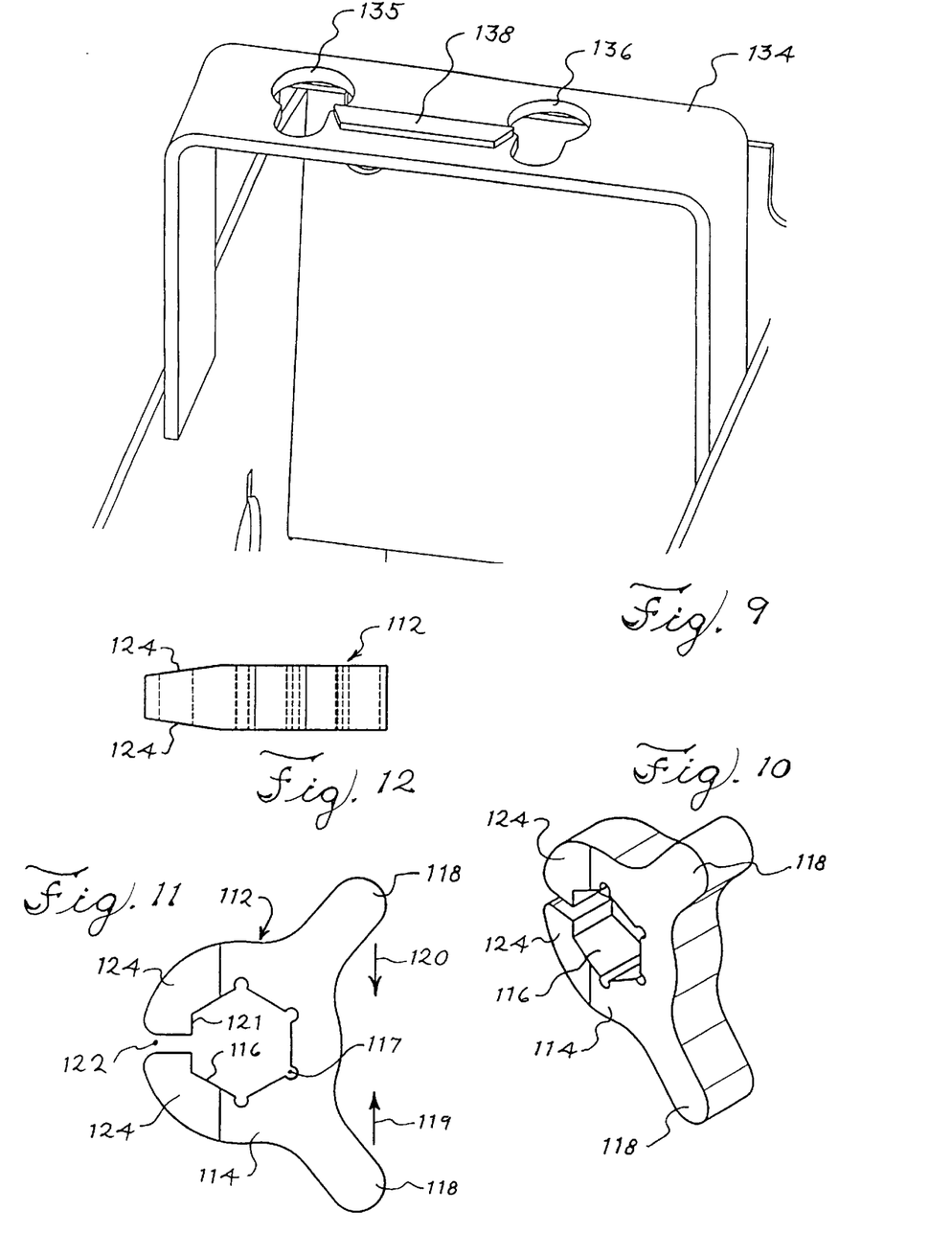
FIG. 9 is a preferred embodiment of a brace attached to a housing.
FIG. 10 is a perspective view of a preferred embodiment of a sprocket positioning member.
FIG. 11 is a side view of the embodiment of FIG. 10.
FIG. 12 is a top view of the embodiment of FIG. 11.

Referring to FIGS. 3 and 6, a plurality of positioning members 112 are slidably attached to hex shaft 37 and hex shaft 110. A preferred embodiment of the positioning members 112 is shown in FIGS. 10–12. Preferably, each positioning members 112 includes a body portion having a hexagonal-shaped inner wall portion 116, which is designed to fit on to the hex shafts 37, 110. The positioning members 112 also include a pair of extended grip portions 118 to allow an operator to easily grasp the grip portions 118 and squeeze them in the direction indicated by arrows 119, 120 to open gap 122 a sufficient distance to allow the positioning member 112 to fit on to the hex shaft. As shown in FIG. 12, the body portion 114 preferably includes tapered portions 124 to allow the operator to more easily press the last of the snugly packed positioning members 112 on to the hex shaft. The taper may be, for example, 8 degrees. The positioning members 112 may be positioned on either side of the input driven sprocket assembly 36, and either side of output driver sprocket assembly 40 on hex shaft 37. And, the positioning members 112 may be positioned on either side of output driven sprocket assembly 42 on output hex shaft 110. The positioning members 112 are preferably made of any of a number of flexible and durable materials, for example, Neoprene having a 90-durometer rating. Preferably, the positioning members 112 are made of material, which is also U.V. resistant, and oil resistant.

Figure 2:
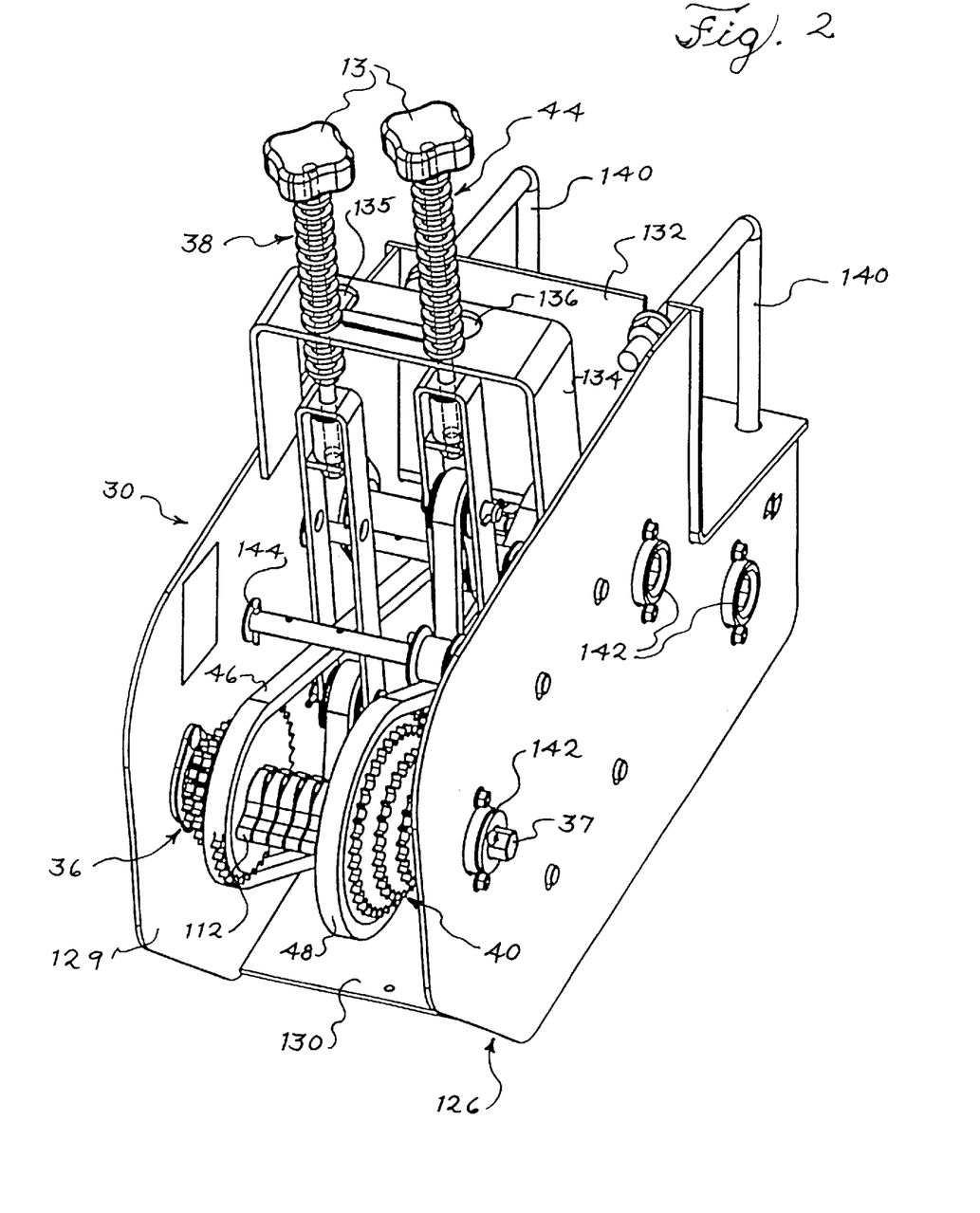
FIG. 2 is a right perspective view of a preferred embodiment of a transmission apparatus made in accordance with the invention.

Referring to FIGS. 2 and 9, the transmission apparatus 30 preferably includes a housing 126. The housing 126 preferably includes side walls 128, 129, bottom wall 130 and back wall 132. A brace member 134 includes slots 135, 136 for receiving the input and output tensioner assemblies 38, 44. The slots 135, 136 preferably include a narrower end 161 to prevent the large diameter spacers or flanges 58 from sliding through the slot and a wider end 162 to allow the spacers or flanges to pass through. The brace member 134 may further preferably include a stop bar 138 which prevents the tensioner assembly from slipping toward the wider ends of the slots 135, 136. The brace member 134 is preferably made of steel or other rigid durable material. The brace member 134 may, for example, in the embodiment shown, be a U-shaped bracket attached with conventional environmental fasteners or welded to the housing 126. Tube brackets 140 may be used to secure the transmission apparatus 30 to the tool bar 15 (shown in FIG. 1). The side walls 128, 129 may preferably include conventional brushings 142 to allow the hex shafts 37, 110 to freely rotate. The idler shafts are preferably fixedly attached to the side walls 128, 129 with conventional fasteners.

In operation, the operator may loosen one or both of the tensioner assemblies 38, 44 from the tightened position (shown in FIG. 8) to a loosened position (shown in FIG. 7). As the threaded tensioner rod 56 is rotated, the spring 62 expands. This allows the operator to pull up slightly on the tensioner rod 56 to allow the flange 58 to overcome the stop bar 138 and push the tensioner assembly 43 from the narrow end of the slots 135 or 136 to the wider end where the tensioner assembly 43 may be lowered to slacken the chain. The operator may then remove the positioning members 112 as necessary, slide the input driven sprocket assembly 36, output driver sprocket assembly 40 and/or output driven sprocket assembly 42 along their respective hex shafts to achieve the desired setting. In the embodiment shown, there are 120 combinations possible for the ratio between the speed of the input shaft 14 and the output shaft 24. This is a substantial improvement over existing systems, which provide a maximum of less than half of this number of different shaft ratios. With the presently preferred embodiment there is a potential 2% change in the feed dispensing rate between each setting. This permits a greater flexibility for the user over the prior art systems where a 4% rate was the maximum permitted. Since this greater flexibility in seeding rate provides the user with the ability to seed at the optimum seeding rate in terms of seed spacing and costs. This ability to have smaller resolution in seeding rate per sprocket setting is significant. For example, corn seed is very finicky with respect to population. A difference of 500 fewer seeds per acre will reduce the yield from the optimum. On the other hand, 500 seeds too many (over planting) will reduce the yield because there will not be enough water per plant. Thus, a resolution of less than 1,000 between transmission settings is desirable. Saving the user 500 seeds per acre may result in substantial cost savings over a few thousand acres. For a planter using a 48 seed cell disk and a 2-1 gear reduction between the output shaft and the seed meter, the disclosed transmission accomplishes this resolution.

Once the sprocket assemblies are slid to the desired location along the respective hex shaft, the positioning members 112 may be inserted on to the hex shaft by grasping the extended grip members 118 to widen the gap 122 and pushing the positioning members 112 on to the hex shaft on either side of the sprocket assemblies, as necessary. The positioning members 112 hexagonal inner wall 116 conforms to the shape of the hex shafts 37, 110 and provides a flat inner wall 121 which aids in retaining the positioning member 112 on the hex shaft.

Once the positioning members 112 are in place on the hex shafts 37, 110, the operator may grasp hold of knob 113 and pull upward on the tensioner assembly 43. As it is pulled upward, the larger diameter spacers or flanges 58 pass through the wider end of the slots 135 or 136 in brace 134. The tensioner assembly 43 may be pulled up as far as possible and then pulled toward the narrower end of the slot. This action locks one of the plurality of larger diameter spacers or flanges 58 behind the stop bar 138. The knob 113 may then be rotated in a reverse direction to further tighten the respective chain 12, which is in contact with the tensioner rollers 52 or 55. As the tensioner rod 56 is rotated, for example, in the embodiment shown, plate 64 forces stop 72 to compress spring 62 (shown in FIG. 8). Alternatively a indicator on the bracket 54, for example, an opening to allow the operator to visually locate the position of the plate 64 or other visual indicator may be used in place of the stop 72 to properly tighten the tensioner assembly 43. Preferably, the knob 113 may include a torque limiting device which will allow a desired torque to be achieved, and then slip to prevent damage to the chain. The torque limiting member may alternatively be positioned anywhere between the knob 113 and the plate 64. Alternatively, the stop 72 may be made of a material, which will allow it to deform to prevent damage to the chain.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A transmission apparatus comprising:

a chain operatively engaged with a driver sprocket assembly and a driven sprocket assembly;

a tensioner bracket including a tension roller rotatably attached to the tensioner bracket, the tension roller engaged with the chain; and a tensioner rod including a plurality of spaced apart flange portions and a threaded portion, the threaded portion extending through an opening formed in the tensioner bracket and screwably attached to a plate, wherein at least one of the flange portions is engageable with a brace.

2. The transmission apparatus of claim 1 further comprising:
a spring positioned between the plate and the tensioner bracket.

3. The transmission apparatus of claim 2 further comprising:
a stop positioned between the spring and the plate.

4. The transmission apparatus of claim 1 wherein the spaced apart flange portion comprises a plurality of alternating large diameter spacers and small diameter spacers attached to the tensioner rod.

5. The transmission apparatus of claim 1 wherein the brace includes a slot formed therein, the tensioner rod partially extending through the slot.

6. The transmission apparatus of claim 5 wherein the slot includes a wide end, which allows the flange portion to pass through, and a narrow end, which prevents the flange portion from passing through.

7. The transmission apparatus of claim 1 wherein the driver sprocket assembly comprises an input driver sprocket assembly, the driven sprocket assembly comprises an input driven sprocket assembly, the input driver sprocket assembly including one sprocket, the input driven sprocket assembly including 4 different sized sprockets.

8. The transmission apparatus of claim 7 further comprising a hex shaft, the input driven sprocket assembly slidably attached to the hex shaft, an output driver sprocket assembly attached to the hex shaft, the output driver sprocket assembly including 5 different sized sprockets, an output driven sprocket assembly attached to an output hex shaft, the output driven sprocket assembly including 6 different sized teeth, a second chain engaged with the output driver sprocket assembly, the output driven sprocket assembly and a tension roller rotatably attached to a second tensioner assembly; wherein an operator may position the transmission at 120 different ratio combinations.

9. The transmission apparatus of claim 1 further comprising at least one idler roller engaged with the chain.

10. The transmission apparatus of claim 9 wherein a pair of idler rollers are engaged with the chain, the tension roller positioned between the idler rollers.

11. The transmission apparatus of claim 1 further comprising a hex shaft, the driven sprocket assembly slidably attached to the hex shaft, a plurality of positioning members removably attached to the hex shaft and positioned on either side of the driven sprocket assembly.

12. The transmission apparatus of claim 11 wherein each of the positioning members include a body portion including hexagonal-shaped inner wall for receiving the hex shaft, and a pair of extended gripping portions extending from the body portion to allow a gap formed through the body portion to be widened to allow the positioning members to be inserted on to the hex shaft.

13. The transmission apparatus of claim 12 wherein each positioning member comprises Neoprene.

14. The transmission apparatus of claim 12 wherein the body portion includes a tapered portion.

15. The tensioning apparatus of claim 1 wherein the chain includes a top portion and a bottom portion, a tension side of the chain is on the top portion and a slack side of the chain is on the bottom portion.

16. The tensioning apparatus of claim 1 wherein the chain includes a top portion and a bottom portion, a tension side of the chain is on the bottom portion and a slack side of the chain is on the top portion.

17. A method of operating a transmission apparatus comprising:

a chain operatively engaged with a driver sprocket assembly and a driven sprocket assembly;

a tensioner bracket including a roller rotatably attached to the tensioner bracket, the roller engaged with the chain;

a tensioner rod including a plurality of spaced apart flange portions and a threaded portion, the threaded portion extending through an opening formed in the tensioner bracket and screwably attached to a plate, wherein at least one of the flange portions is engageable with a brace;

turning the tensioner rod in a first direction; and passing at least one flange portion through a slot formed in the brace to slacken the chain.

18. The method of claim 17 further comprising:

providing a hex shaft, the driven sprocket assembly slidably attached to the hex shaft, the driven sprocket assembly including a plurality of different sized sprockets, a plurality of positioning members removably attached to the hex shaft, the positioning members including a body portion and a pair of extended gripping portions, the body portion including a gap and a hexagonal-shaped inner wall;

squeezing together the extended gripping portions;

widening the gap;

removing at least one of the positioning members from the hexagonal shaft;

sliding the driven sprocket assembly on the hex shaft; and positioning the chain on one of the sprockets of the driven sprocket assembly.

19. The method of claim 18 further comprising:

squeezing together the gripping portions of the removed positioning member; and reinserting the removed positioning member in a different location on the hex shaft.

20. The method of claim 19 further comprising:

moving the tensioner assembly to a narrow end of the slot;

contacting a flange portion against a top surface of the brace; and turning the tensioner rod in a second direction to tighten the chain.

21. The method of claim 20 further comprising:

compressing a spring positioned between the plate and the tensioner bracket.

22. A tensioner apparatus comprising:

an input driver sprocket assembly;

an input chain engaged with the input driver sprocket assembly;

an input driven sprocket assembly engaged with the first chain and slidably attached to a first shaft;

an output driver sprocket assembly slidably attached to the first shaft;

a output chain engaged with the output driver sprocket assembly;

an output driven sprocket assembly engaged with the output chain and slidably attached to a second shaft;

a first tensioner assembly, and a second tensioner assembly, each tensioner assembly including a bracket and a threaded rod extending through an opening formed in the bracket, a tensioner roller rotatably attached to the bracket, the threaded rod screwably attached to a plate, the threaded rod including a plurality of spaced apart flange portions; and the tensioner roller of the first tensioner assembly engaged with the input chain, the flange portion of the first tensioner assembly operatively engageable with a brace, and the tensioner roller of the second tensioner assembly engaged with the output chain, the flange portions of the second tensioner assembly operatively engageable with the brace.

23. The tensioner apparatus of claim 22 wherein the brace includes a first slot for receiving the flange portion of the first tensioner assembly, and a second slot for receiving the flange portion of the second tensioner assembly.

24. The tensioner apparatus of claim 21 wherein the brace comprises a U-shaped bracket.

25. The transmission apparatus of claim 21 further comprising a spring positioned between the plate and the bracket of each of the first and second tensioner assemblies.

26. The tensioner apparatus of claim 22 further comprising a pair of idler rollers engaged with the input chain, and a pair of idler rollers engaged with the output chain.

27. The tensioner apparatus of claim 22 further comprising a plurality of positioning members removably positioned on an input shaft engaged with the input chain and an output shaft engaged with the output chain, the input shaft and the output shaft each comprising a hex shaft, the positioning members including a hexagonal-shaped inner wall to conform to the hex shaft and preventing the positioning members from falling off the input and output shafts.

* * * * *